(12) United States Patent
Fujishima

(10) Patent No.: US 6,759,825 B2
(45) Date of Patent: Jul. 6, 2004

(54) CONTROL METHOD AND CONTROL APPARATUS FOR FEED SYSTEM

(75) Inventor: Makoto Fujishima, Yamatokoriyama (JP)

(73) Assignees: Mori Seiki Co., Ltd., Yamatokoriyama (JP); Intelligent Manufacturing Systems International, Sacramento, CA (US)

( * ) Notice: Subject to any disclaimer, the term of this patent is extended or adjusted under 35 U.S.C. 154(b) by 148 days.

(21) Appl. No.: 10/212,815

(22) Filed: Aug. 7, 2002

(65) Prior Publication Data

US 2003/0030401 A1 Feb. 13, 2003

(30) Foreign Application Priority Data

Aug. 9, 2001 (JP) ........................................ 2001-242066

(51) Int. Cl.$^7$ ............................................. G05D 23/275
(52) U.S. Cl. ........................ 318/632; 318/630; 318/633; 318/638; 318/652
(58) Field of Search ................................ 318/630, 632, 318/633, 638, 652

(56) References Cited

U.S. PATENT DOCUMENTS 3,579,069 A * 5/1971 Reuteler et al. ............ 318/571
3,579,070 A * 5/1971 Crocker et al. ............. 318/571
4,378,592 A * 3/1983 Heiberger et al. .......... 700/206

OTHER PUBLICATIONS

Patent Abstracts of Japan, Publication No. 11-237920 Aug. 31, 1999.
Patent Abstracts of Japan, Publication No. 2000-176792 Jun. 27, 2000.

* cited by examiner

*Primary Examiner*—Rita Leykin
(74) *Attorney, Agent, or Firm*—Westerman, Hattori, Daniels & Adrian, LLP

(57) ABSTRACT

The invention concerns a feed system control method and apparatus that can calculate an accurate backlash amount and can accomplish highly precise position control. Position errors are calculated before and after a reversal in direction of movement of a slide 30, each from the difference between the position data of the slide 30 detected by a linear scale 25 and the position data of the slide 30 calculated from the rotational position data of the servo motor 23 detected by a rotary encoder 24. The backlash amount of the slide 30 is calculated from the difference between the position error before the reversal and the position error after the reversal thus calculated. Thereafter, when reversing the direction of movement of the slide 30, the feed speed during direction reversal is increased in accordance with the backlash amount.

3 Claims, 3 Drawing Sheets

CONTROL METHOD AND CONTROL APPARATUS FOR FEED SYSTEM

BACKGROUND OF THE INVENTION

1. Field of the Invention

The present invention relates to a control method and control apparatus for a feed system which comprises a drive mechanism for moving a slide along a straight line, a servo motor forgiving power to the driving mechanism, a rotational position detection means for detecting the rotational position of the servo motor, and a position detection means for detecting the position of the slide.

2. Description of the Prior Art

A feed system provided in an NC machine tool or the like comprises a drive mechanism for moving a slide such as a machine table along a straight line, a servo motor for giving power to the drive mechanism, a rotational position detection means for detecting the rotational position of the servo motor, etc. The drive mechanism comprises, for example, a ball screw (lead screw) driven by the servo motor, a nut screwed onto the ball screw, etc. and causes the table to move along the ball screw by means of the nut moving in the axial direction of the ball screw with the rotation of the ball screw.

The servo motor is feedback controlled by a control unit; in the case of a semi-closed system, the rotational position of the servo motor (equivalent to the position of the slide) and the rotational speed of the servo motor (equivalent to the feed speed of the slide) are feedback controlled based on the data detected by the rotational position detection means. On the other hand, in the case of a system employing full-closed feedback control, a position detection means such as a linear scale is included in order to detect the position of the slide, and the position control is performed based on the position data detected and fed back by the position detection means, while the speed control is performed based on the speed data detected and fed back by the rotational position detection means.

Here, a gap, or backlash, inherently exists between the thread grooves of the ball screw and nut and the balls constrained between them. There also occurs a lost motion due to the deflection of the ball screw. Accordingly, in the case of the semi-closed system that performs the position control by reference to the rotational position of the ball screw, when the direction of rotation of the ball screw, and hence the direction of movement (feed direction) of the slide, is reversed, a positioning error occurs by an amount equal to the amount of backlash and the degree of deflection of the ball screw. In the prior art semi-closed system, therefore, it has been practiced to detect the backlash amount in advance and to correct the position by an amount equal to the detected backlash amount when reversing the feed direction of the slide. In the full-closed feedback control, on the other hand, the positioning error due to the backlash or the deflection of the ball screw does not occur, since the control is performed by directly detecting the position of the slide.

Further, in both the semi-closed system and the full-closed system, when reversing the feed direction of the slide, a delay equal to the amount of backlash occurs in the reversing action of the slide (a delay in tracking the target position). In a machining center, when the tool is moved from one quadrant to another, for example, during a circular arc cutting, the above delay has resulted in the formation of a bump when cutting an outer circumferential arc, and a recess when cutting an inner circumferential arc. In the prior art, therefore, in order to obtain a smooth arc surface free from bumps or recesses, when reversing the feed direction of the slide it has been practiced to increase the feed speed during direction reversal (including the starting speed) in accordance with the backlash amount, thereby reducing the delay in tracking the target position.

The amount by which the feed speed is increased has been determined empirically by actually performing cutting operations, or based on correlation with the backlash amount. In the semi-closed system, the backlash amount is calculated from actual measurements, while in the full-closed system, the backlash amount is calculated from a difference between the position data of the slide detected by the position detection means and the position data of the slide calculated based on the rotational position data detected by the rotational position detection means.

However, the backlash amount is not constant, but increases with age due to the wear of the thread grooves of the ball screw and nut or the wear of the balls. As a result, if the amount by which the feed speed is to be increased during the reversal is left at its original setting, the backlash amount increasing with age cannot be accommodated and highly precise position control of the slide cannot be accomplished, thus leading to the problem that the bump or recess that occurs when switching from one quadrant to another gradually increases in size. Furthermore, if the pretension of the ball screw changes due to thermal expansion, the rigidity of the ball screw changes, and this change in rigidity causes the lost motion to vary. This also results in the problem that the bump or recess that occurs when switching from one quadrant to another changes in shape. In a machine tool designed to operate in a semi-closed control mode, this has lead to the problem that the accurate backlash amount and lost motion amount have to be re-measured periodically, that is, such time and labor consuming work has to be done periodically if highly precise machining is to be achieved.

On the other hand, in a machine tool designed to operate in a full-closed control mode, the above problem does not occur since the backlash amount and lost motion amount can be calculated from the position data detected by the position detection means and the rotational position data detected by the rotational position detection means, but in this case also, there arises the following problem.

That is, since the ball screw tends to thermally expand due to the heating of the screw supporting bearings and the frictional heat generated by the balls running in the thread grooves, and the balls tend to suffer deformation due to load, the backlash amount calculated from the position data detected by the position detection means and the rotational position data detected by the rotational position detection means, as described above, is inaccurate as it contains effects due to the thermal expansion of the ball screw and the deformation of the balls in addition to the actual backlash amount. As a result, if the amount by which the speed is to be increased during feed direction reversal is set based on such inaccurate backlash amount, highly precise position control of the slide cannot be accomplished.

In view of the above situation, it is an object of the present invention to provide a feed system control method and control apparatus that can calculate an accurate backlash amount in a periodic or non-periodic manner and can accomplish highly precise position control.

SUMMARY OF THE INVENTION

The present invention which solves the above problem concerns a feed system control apparatus and control method for controlling the operation of a feed system which comprises a drive mechanism for moving a slide along a straight line, a servo motor for giving power to the drive mechanism, a rotational position detection means for detecting the rotational position of the servo motor, and a position detection means for detecting the position of the slide, wherein the control apparatus and control method are provisioned to perform the processing of:

calculating position errors before and after a reversal in direction of movement of the slide, each from a difference between the position data of the slide detected by the position detection means and the position data of the slide calculated from the rotational position data of the servo motor detected by the rotational position detection means;

subsequently, calculating a backlash amount for the drive mechanism from a difference between the calculated position error before the reversal and the calculated position error after the reversal; and when thereafter reversing the direction of movement of the slide, increasing feed speed during direction reversal in accordance with the calculated backlash amount.

According to the present invention, positions errors are calculated before and after the reversal of the feed direction of the slide, each from the difference between the position data of the slide detected by the position detection means and the position data of the slide calculated based on the rotational position data detected by the rotational position detection means, and then the backlash amount of the drive mechanism is calculated from the difference between the position error before the reversal and the position error after the reversal.

Since the ball screw tends to thermally expand due to the heating of the screw supporting bearings and the frictional heat generated by the balls running in the thread grooves, and the balls tend to suffer deformation due to load, as earlier described, the position error calculated from the difference between the position data detected by the position detection means and the rotational position data detected by the rotational position detection means contains error factors such as the thermal expansion of the ball screw. In the present invention, however, since the position errors are calculated before and after the reversal of the slide respectively, and the backlash amount is calculated from their difference, the backlash amount can be calculated accurately, canceling the error factors such as the thermal expansion described above.

Thereafter, when reversing the direction of movement of the slide, the feed speed (including the starting speed) is increased in accordance with the thus obtained accurate backlash amount. Thus, according to the present invention, it becomes possible to control the position of the slide highly precisely.

Preferably, the position error data before the reversal is taken immediately before the reversal, and the position error data after the reversal is taken immediately after the reversing action is completed. Further, the backlash amount is calculated continually at periodic or non-periodic intervals. As a result, if the backlash amount increases with age due to the wear of the thread grooves of the ball screw and nut or the wear of the balls, the position of the slide can be controlled highly precisely, without requiring time and labor consuming work.

The control apparatus, more specifically, comprises: a parameter storage section which stores a parameter that has been set in accordance with the backlash amount of the drive mechanism; a backlash acceleration executing section which reads out the parameter stored in the parameter storage section, and increases the feed speed during the direction reversal in accordance with the parameter when reversing the direction of movement of the slide; a backlash amount calculation section which calculates the position errors before and after the reversal of the direction of movement of the slide, each from the difference between the position data of the slide detected by the position detection means and the position data of the slide calculated from the rotational position data of the servo motor detected by the rotational position detection means, and subsequently, calculates the backlash amount for the drive mechanism from the difference between the calculated position error before the reversal and the calculated position error after the reversal; a backlash acceleration amount calculation section which, based on the backlash amount calculated by the backlash amount calculation section, calculates the acceleration amount to be applied when reversing the direction of movement of the slide; and a parameter setting section which, based on the acceleration amount calculated by the backlash acceleration amount calculation section, sets a parameter appropriate to the acceleration amount, and updates the parameter stored in the parameter storage section with the set parameter.

DESCRIPTION OF THE PREFERRED EMBODIMENT

Figure 1:
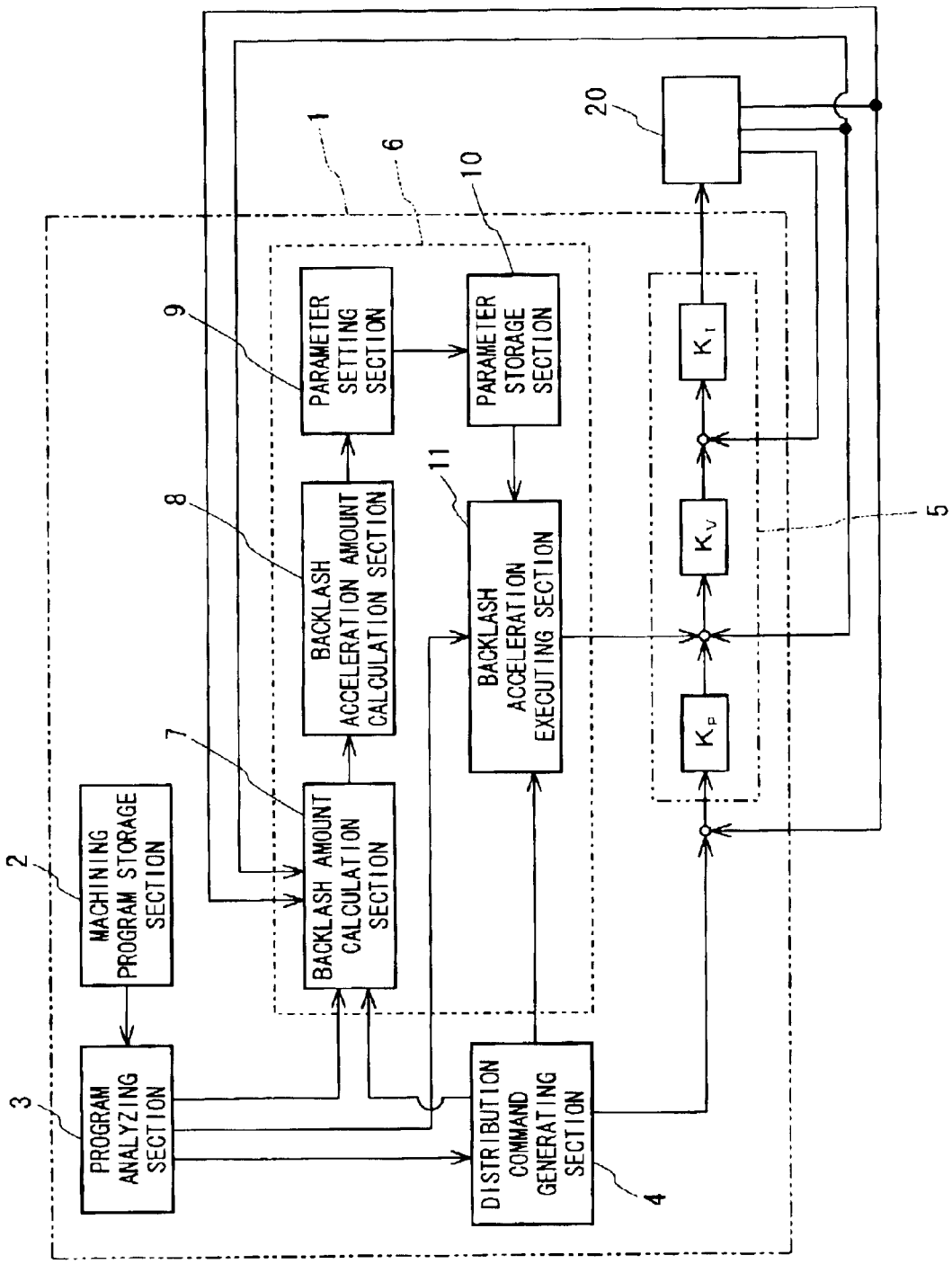
FIG. 1 is a block diagram schematically showing the configuration of a control apparatus according to one embodiment of the present invention.
Figure 2:
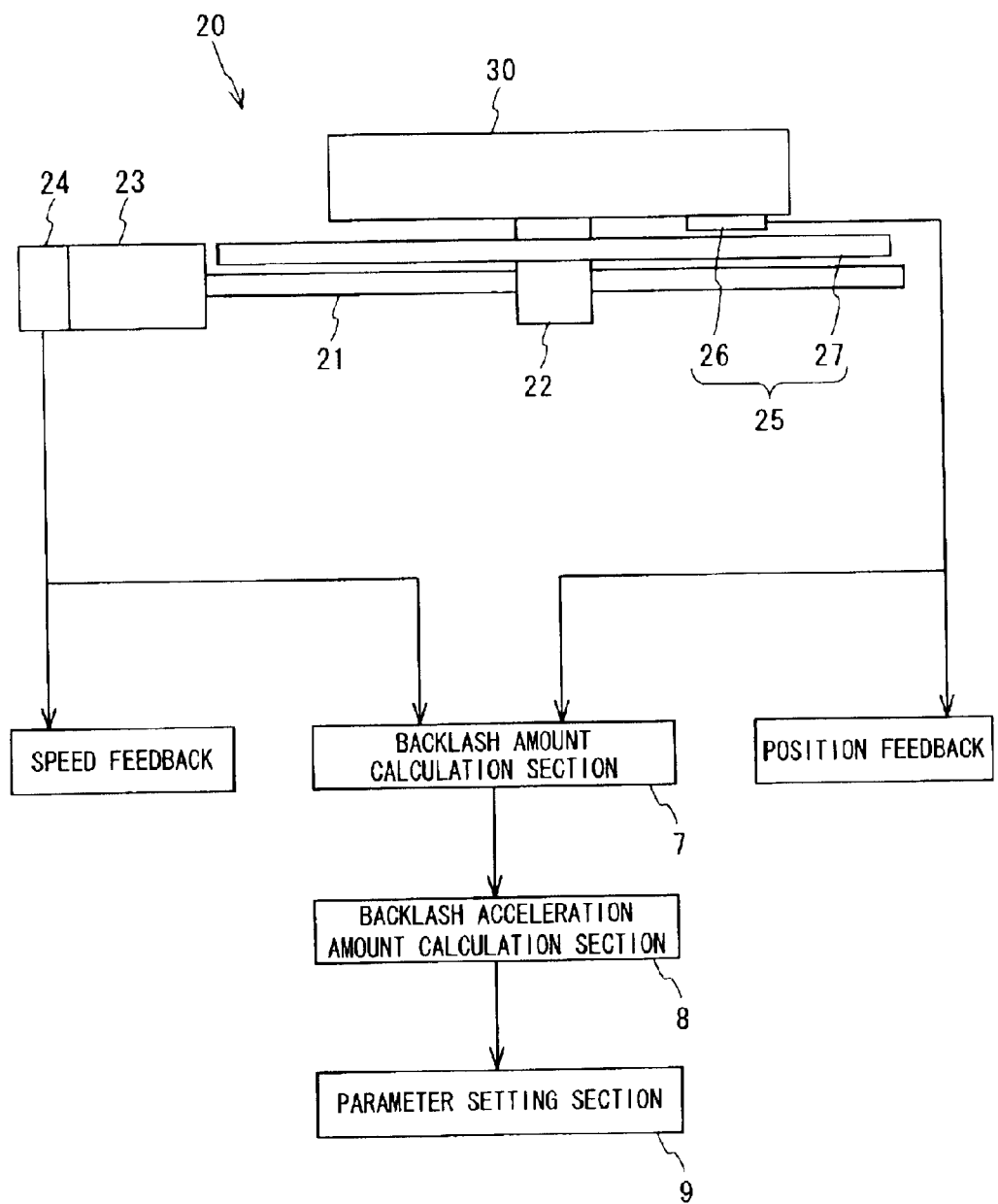
FIG. 2 is an explanatory diagram schematically showing the construction of a feed system along with the configuration of a portion of the control apparatus according to the present embodiment.
Figure 3:
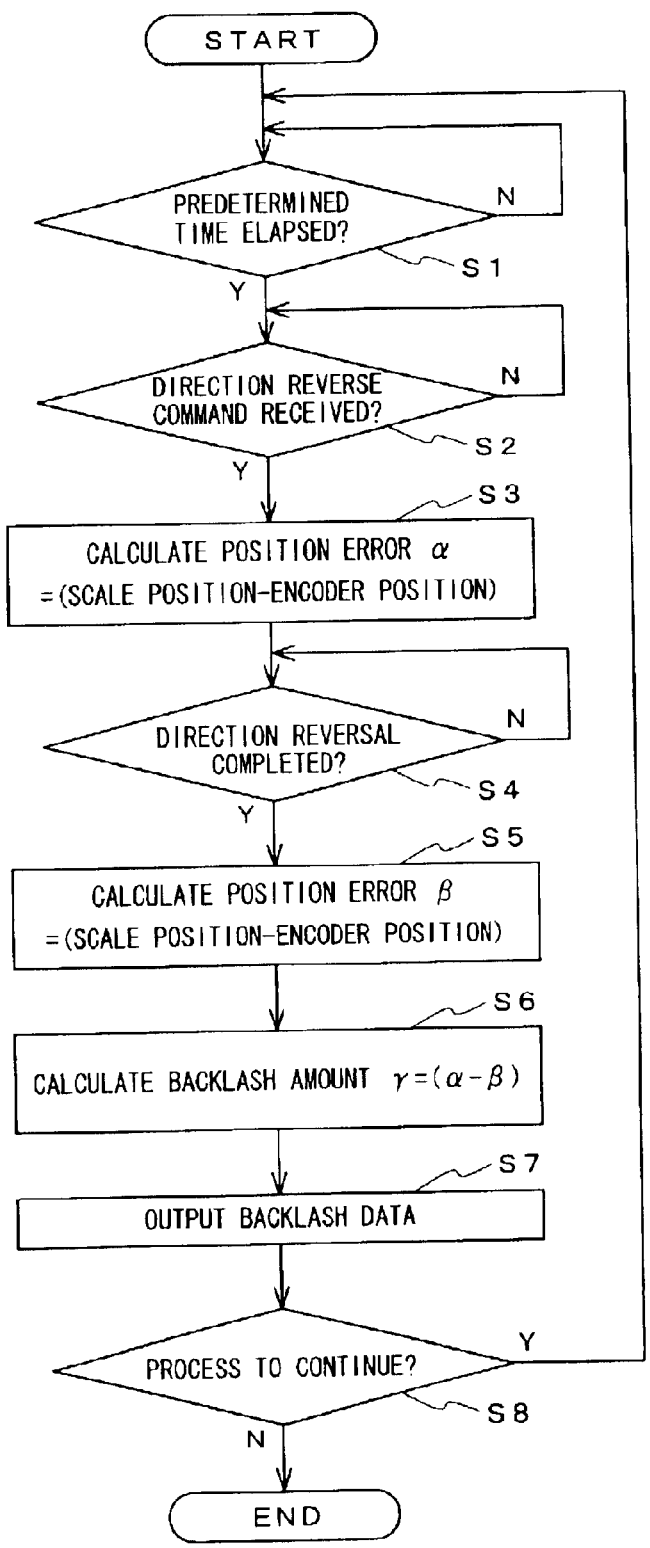
FIG. 3 is a flow chart illustrating a processing procedure in a backlash amount calculation section according to the present embodiment.

The preferred embodiment of the present invention will be described below with reference to the accompanying drawings. FIG. 1 is a block diagram schematically showing the configuration of a control apparatus according to one embodiment of the present invention, FIG. 2 is an explanatory diagram schematically showing the construction of a feed system along with the configuration of a portion of the control apparatus according to the present embodiment, and FIG. 3 is a flow chart illustrating a processing procedure in a backlash amount calculation section according to the present embodiment.

As shown in FIG. 1, the control apparatus 1 of this embodiment comprises a machining program storage section 2, a program analyzing section 3, a distribution command generating section 4, a feed drive control section 5, a backlash acceleration processing section 6, etc. The machining program storage section 2 is a functional section for storing a pre-created machining program, and the program analyzing section 3 analyzes the machining program stored in the machining program storage section 2, extracts commands relating to the feed speed, destination position, etc. of the feed system 20 from the machining program, and transmits the extracted commands relating to the feed speed, destination position, etc. of the feed system 20 to the distribution command generating section 4.

The distribution command generating section 4 generates a signal of movement target position (movement command signal) at prescribed intervals of time for the feed system 20 by considering a predetermined time constant based on the received signal, and sequentially supplies the generated signal to the feed drive control section 5.

The feed drive control section 5 first generates a speed command signal by multiplying the deviation between the received signal of movement target position and the current position signal fed back from the feed system 20 (linear scale 25) by a position loop gain $K_P$, and then generates an electric current command signal by multiplying the deviation between the thus generated speed command signal and the current speed signal fed back from the feed system 20 (rotary encoder 24) by a speed loop gain $K_V$; after that, an electric current obtained by multiplying the deviation between the thus generated electric current command signal and the driving electric current signal currently fed back from the feed system 20 (servo motor 23) by an electric current loop gain $K_I$ is supplied as a driving command signal to the feed system 20 (servo motor 23), and the operation of the feed system 20 (servo motor 23) is controlled by the received driving command signal.

As shown in FIG. 2, the feed system 20 comprises a ball screw 21, a nut 22 screwed onto the ball screw 21 and fixed to a slide 30, the servo motor 23 for rotationally driving the ball screw 21, the rotary encoder 24 for detecting the rotational position of the servo motor 23, and the linear scale 25 for detecting the position of the slide 30 along the feed direction thereof. The operation of the servo motor 23 is controlled by the feed drive control section 5, and the slide 30 is guided along a suitable guiding means (not shown) by the action of the servo motor 23 and the ball screw 21 and nut 22, and moves in the guided direction (feed direction).

The position data detected by the rotary encoder 24 is sampled at suitable intervals, and the difference value for each sampling interval is fed back as a speed feedback signal to the feed drive control section 5. The linear scale 25 is constructed from a magnetic scale or an optical scale, and comprises a scale 27 arranged along the feed direction of the slide 30 and a read head 26, fixed to the slide 30 so as to face the scale 27, for reading graduations formed on the scale 27; the position data detected by the read head 26 is fed back as a position feedback signal to the feed drive control section 5.

As shown in FIG. 1, the backlash acceleration processing section 6 comprises a backlash amount calculation section 7, a backlash acceleration amount calculation section 8, a parameter setting section 9, a parameter storage section 10, and a backlash acceleration executing section 11.

The backlash amount calculation section 7, as shown in FIGS. 1 and 2, receives the rotational position data of the servo motor 23 from the rotary encoder 24 and the position data of the slide 30 from the linear scale 25. The backlash amount calculation section 7 calculates the position data of the slide 30 from the rotational position data of the servo motor 23 thus received, calculates position errors before and after a reversal in the feed direction of the slide 30 each from the difference between the position data of the slide 30 obtained from the rotary encoder 24 and the position data of the slide 30 obtained from the linear scale 25, and calculates the amount of backlash between the ball screw 21 and the nut 22 from the difference between the position error before the reversal and the position error after the reversal thus calculated. The calculation of the backlash amount is performed at prescribed intervals of time.

The processing performed in the backlash amount calculation section 7 will be described in further detail with reference to FIG. 3. As shown in the figure, the backlash amount calculation section 7 initiates the process upon receiving a machining start command from the program analyzing section 3, the process proceeding to step S2 after a predetermined time has elapsed (step S1).

In step S2, it is determined whether a feed direction reverse command has been received from the program analyzing section 3 (this command is received when there occurs a reversal in the direction of movement indicated by the position command transmitted from the program analyzing section 3), and when the feed direction reverse command is received, the position error $\alpha$ immediately before the reversal is calculated from the difference between the position data of the slide 30 obtained from the rotary encoder 24 and the position data of the slide 30 obtained from the linear scale 25 (step S3). Here, the backlash amount calculation section 7 is receiving the signal of movement target position (movement command signal) being transmitted from the distribution command generating section 4 to the feed drive control section 5, and calculates the position error $\alpha$ based on the position data of the slide 30 immediately before the reversal of the movement target position signal.

Next, the backlash amount calculation section 7 monitors the position data of the slide 30 being transmitted from the linear scale 25 to see if there occurs a reversal in the received position data (step S4) and, when the position data is reversed, then determines that the reversal of the feed direction is completed and calculates position error $\beta$ immediately after the reversal from the difference between the position data of the slide 30 obtained from the rotary encoder 24 and the position data of the slide 30 obtained from the linear scale 25 (step S5).

Then, the backlash amount calculation section 7 calculates the backlash amount $\gamma$ from the difference between the thus calculated position errors $\alpha$ and $\beta$ (step S6), and supplies the calculated backlash data to the backlash acceleration amount calculation section 8 (step S7). After that, the process starting from step S1 is repeated until a machining end signal is received from the program analyzing section 3 (step S8).

Based on the backlash amount calculated by the backlash amount calculation section 7, the backlash acceleration amount calculation section 8 calculates the amount of acceleration to be applied when reversing the feed direction of the slide 30. The acceleration amount can be calculated in the following manner. First, acceleration amounts that can achieve work surfaces free from bumps or recesses are empirically obtained by actually cutting a shape such as a circular arc using similar feed systems 20 having suitably different backlash amounts, and these acceleration amounts are stored in the form of a data table by associating them with backlash amounts so that the backlash acceleration amount calculation section 8 can obtain the acceleration amount appropriate to the backlash amount by referring to the data table. Alternatively, an equation (approximate equation) defining the relation between the backlash amount and the acceleration amount may be obtained in advance from the data table, and the acceleration amount appropriate to the backlash amount may be calculated using the equation.

The parameter setting section 9 parameterizes the acceleration amount calculated by the backlash acceleration amount calculation section 8, stores the parameter in the parameter storage section 10, and updates the parameter stored in the parameter storage section 10 by parameterizing the acceleration amount each time the acceleration amount is calculated by the backlash acceleration amount calculation section 8. This parameter may be set as a coefficient determined in accordance with the acceleration amount, or as the acceleration amount itself.

The backlash acceleration executing section 11 initiates processing upon receiving the machining start command from the program analyzing section 3, and when there occurs a reversal in the movement target position signal (movement command signal) being transmitted from the distribution command generating section 4 to the feed drive control section 5, the backlash acceleration executing section 11 reads out the parameter stored in the parameter storage section 10 and transmits a speed signal appropriate to the readout parameter to the feed drive control section 5, which thus increases the feed speed (including the starting speed) of the slide at the time of reversal.

Only one feed system 20 has been shown in FIG. 1, but usually a machining tool such as a machining center is equipped with a plurality of feed systems 20 and a distribution command generating section 4 and feed drive control section 5 for each feed system 20, and the backlash acceleration processing section 6 performs the same processing as described above on each feed system 20.

According to the control apparatus 1 of the embodiment having the above-described configuration, the machining program stored in the machining program storage section 2 is analyzed by the program analyzing section 3, and commands relating to the feed speed and destination position of the feed system 20 are transmitted to the distribution command generating section 4. In the distribution command generating section 4, the movement command signal is generated at prescribed intervals of time by considering the predetermined time constant based on the received signal, and the generated signal is sequentially sent to the feed drive control section 5. Then, the servo motor 23 of the feed system 20 is feedback controlled in a full-closed mode by the feed drive control section 5.

On the other hand, in the backlash acceleration processing section 6, the position errors α and β immediately before and after the reversal of the feed direction of the slide 30 are calculated by the backlash amount calculation section 7 at prescribed intervals of time from the difference between the position data of the slide 30 obtained from the rotary encoder 24 and the position data of the slide 30 obtained from the linear scale 25, and the backlash amount γ between the ball screw 21 and the nut 22 is calculated from the difference between the position error α immediately before the reversal and the position error β immediately after the reversal thus calculated. Then, based on the backlash amount γ, the backlash acceleration amount is calculated by the backlash acceleration amount calculation section 8 and, based on the thus calculated backlash acceleration amount, the parameter appropriate to it is set by the parameter setting section 9 and is stored in the parameter storage section 10, updating the data stored in the parameter storage section 10.

When there occurs a reversal in the movement target position signal (movement command signal) being transmitted from the distribution command generating section 4 to the feed drive control section 5, the parameter stored in the parameter storage section 10 is read out by the backlash acceleration executing section 11, and a speed increase signal with the acceleration amount corresponding to the parameter is generated for a predefined length of time at prescribed intervals of time. The speed increase signal thus generated is sequentially transmitted to the feed drive control section 5, and the feed speed of the slide 30 during feed reversal is increased by adding the speed increase signal to the speed command signal generated within the feed drive control section 5. This serves to eliminate the delay in the reversing action of the slide 30 caused by the backlash when the feed direction of the slide 30 is reversed; for example, when cutting a circular arc, bumps and recessed can be prevented from being formed on the cutting surface by such delay.

Further, in the control apparatus 1 of the present embodiment, since the position errors α and β are calculated before and after the reversal of the slide 30, and the backlash amount γ is calculated from their difference, the backlash amount γ can be calculated accurately, canceling error factors such as the thermal expansion described earlier. Since the feed speed of the slide 30 during direction reversal is increased in accordance with the accurate backlash amount γ thus obtained, highly precise contour control of the slide 30 can be achieved.

Furthermore, in the present embodiment, since the backlash amount γ is calculated periodically and continually, if the backlash increases with age due to the wear of the thread grooves of the ball screw 21 and nut 22 or the wear of the balls, such increase in backlash can be accommodated, without requiring time and labor consuming work.

While the invention has been described with reference to one specific embodiment, it will be appreciated that the invention is by no means limited to this specific embodiment. For example, in the above embodiment, the processing in the backlash acceleration executing section 11 is initiated by receiving a machining start command from the machining program analyzing section 3, but alternatively, provisions may be made to initiate the processing only when a backlash acceleration execute command directed by a prescribed code in the program is received from the program analyzing section 3.

What is claimed is:

1. A feed system control method for controlling the operation of a feed system which comprises a drive mechanism for moving a slide along a straight line, a servo motor for giving power to said drive mechanism, a rotational position detection means for detecting the rotational position of said servo motor, and a position detection means for detecting the position of said slide, wherein said control method is provisioned to perform the processing of:

calculating position errors before and after a reversal in direction of movement of said slide, each from a difference between the position data of said slide detected by said position detection means and the position data of said slide calculated from the rotational position data of said servo motor detected by said rotational position detection means;

subsequently, calculating a backlash amount for said drive mechanism from a difference between said calculated position error before said reversal and said calculated position error after said reversal; and increasing feed speed during direction reversal in accordance with said calculated backlash amount when reversing the direction of movement of said slide.

2. A feed system control apparatus for controlling the operation of a feed system which comprises a drive mechanism for moving a slide along a straight line, a servo motor for giving power to said drive mechanism, a rotational position detection means for detecting the rotational position of said servo motor, and a position detection means for detecting the position of said slide, wherein said control apparatus is configured to perform the processing of:

calculating position errors before and after a reversal in direction of movement of said slide, each from a difference between the position data of said slide detected by said position detection means and the position data of said slide calculated from the rotational position data of said servo motor detected by said rotational position detection means;

subsequently, calculating a backlash amount for said drive mechanism from a difference between said calculated position error before said reversal and said calculated position error after said reversal; and increasing feed speed during direction reversal in accordance with said calculated backlash amount when reversing the direction of movement of said slide.

3. A feed system control apparatus as set forth in claim 2, wherein said control apparatus comprises:

a parameter storage section which stores a parameter that has been set in accordance with the backlash amount of said drive mechanism;

a backlash acceleration executing section which reads out said parameter stored in said parameter storage section, and increases the feed speed during said direction reversal in accordance with said parameter when reversing the direction of movement of said slide;

a backlash amount calculation section which calculates the position errors before and after the reversal of the direction of movement of said slide, each from the difference between the position data of said slide detected by said position detection means and the position data of said slide calculated from the rotational position data of said servo motor detected by said rotational position detection means, and subsequently, calculates the backlash amount for said drive mechanism from the difference between said calculated position error before said reversal and said calculated position error after said reversal;

a backlash acceleration amount calculation section which, based on the backlash amount calculated by said backlash amount calculation section, calculates the acceleration amount to be applied when reversing the direction of movement of said slide; and a parameter setting section which, based on the acceleration amount calculated by said backlash acceleration amount calculation section, sets a parameter appropriate to said acceleration amount, and updates the parameter stored in said parameter storage section with said set parameter.

* * * * *